F. V. GROVER
ATTACHMENT FOR AUTOMOBILE WHEELS.
APPLICATION FILED JAN. 2, 1912.
1,038,569.
Patented Sept. 17, 1912.
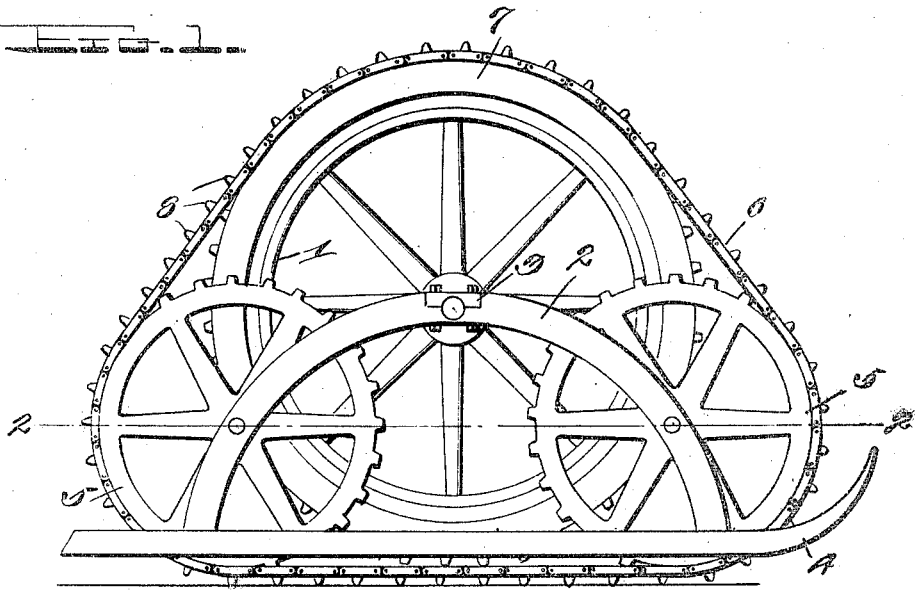
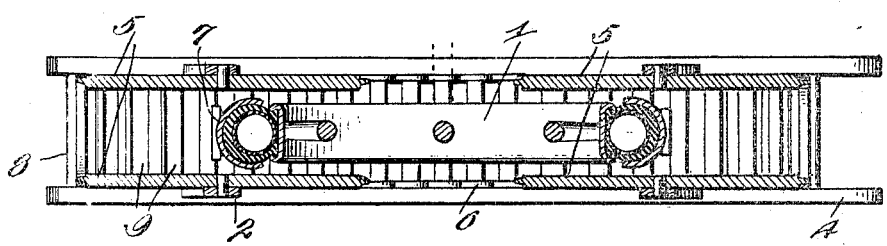
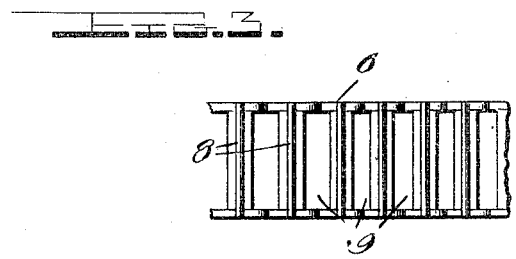
Inventor
F. V. Grover,
Witnesses
Chas. L. Griesbauer.
G. B. Norton.
By Watson E. Coleman.
Attorney

UNITED STATES PATENT OFFICE.

FRED V. GROVER, OF PARK RAPIDS, MINNESOTA.

ATTACHMENT FOR AUTOMOBILE-WHEELS.

1,038,569.

Specification of Letters Patent.    Patented Sept. 17, 1912.

Application filed January 2, 1912. Serial No. 668,870.

*To all whom it may concern:*

Be it known that I, FRED V. GROVER, a citizen of the United States, residing at Park Rapids, in the county of Hubbard and State of Minnesota, have invented certain new and useful Improvements in Attachments for Automobile-Wheels, of which the following is a specification, reference being had to the accompanying drawings.

This invention relates to automobiles and more particularly to attachments for the wheels of the same, that will enable the automobile to readily travel over slippery surfaces, such as ice and the like.

The main object of this invention is to provide an attachment which may be readily applied to an automobile wheel, so that the same may be enabled to readily travel over ice and snow.

Another object of this invention is to have the attachment so that it can be readily placed on or removed from an automobile wheel.

A still further object of this invention is to have the device as simple as possible so that it can be manufactured at a comparatively low cost, and so that the parts of the same can be readily inspected and repaired, whenever the same is desirable.

Other objects of this invention will become apparent as it is more fully set forth.

In the construction shown by way of example in the drawings, Figure 1 represents a view in elevation of an attachment embodying this invention. Fig. 2 is a sectional view along the line 2—2 of Fig. 1. Fig. 3 is a detail of a chain used in this invention.

Similar reference characters refer to similar parts throughout the drawings.

In the construction shown in the drawings, 1 represents an automobile wheel, which is mounted on the attachment, which embodies this invention. The attachment consists in general of a frame portion 2, whose upper portion 3 is provided with means for engaging with the axle of the automobile wheel, and whose lower portion has a pair of runners 4 attached thereto and arranged to come adjacent to the ground, or to slide on the same as the case may be. The frame has four sprocket wheels 5 arranged to come in front of and in the rear of the automobile wheel, as is clearly shown in the drawings. A chain 6 is disposed on the wheel and arranged to come in front of the automobile wheel, and to engage with the sprocket wheels 5, and also with a transversely bored sprocket casing 7, which is removably mounted on an automobile wheel, for the purpose of providing suitable means for transmitting the motion from the automobile wheel to the gears.

Mounted on the chain are a number of cleats 8, which are arranged to engage with the ground and thereby propel the vehicle. The slots 9 in the chain are arranged to permit the sprocket teeth of the casing 7 and of the wheels 5 to project therethrough, but not sufficiently to extend beyond the cleats 8.

The wheels are so disposed on the frame as to project slightly beyond the runners so that the chain with its cleats will normally make engagement with the ice or ground over which the automobile runs. However, when running over snow, or soft ground, the chain will sink sufficiently into the same, to permit the runners to rest and slide on the same.

It can be readily seen that the automobile wheels will readily turn the sprocket wheels, and also the chain in its motion, so that no further description of the operation of the attachment appears necessary.

Obviously while there is shown but one form of this invention in the drawings, it is not desired to limit this application for Letters Patent to that particular form, or in any other way otherwise than necessitated by the prior art, as many modifications in the construction thereof may be made without departing from the scope of the appended claim.

Having thus described this invention, what is claimed is:—

A device of the character described, including a pair of runners, curved braces secured to and extending vertically from said runners, front and rear sprocket wheels journaled in said braces at the front and rear thereof and arranged in laterally disposed pairs, a vehicle wheel journaled in said braces at a point above the said sprocket wheels, a sprocket casing detachably encircling the second mentioned wheel and provided with transversely extending sprocket teeth, and a sprocket chain provided with transversely extending ground engaging members, the said sprocket chain passing around the said sprocket wheels and the second mentioned wheel, as and for the purpose set forth.

In testimony whereof I hereunto affix my signature in the presence of two witnesses.

FRED V. GROVER.

Witnesses:
 W. M. TABER,
 NELLIE TOOGOOD